United States Patent [19]

Tsushima

[11] Patent Number: 5,010,567
[45] Date of Patent: Apr. 23, 1991

[54] RECORDER CONTROL APPARATUS FOR AUTOMATIC TELEPHONE ANSWERING SYSTEM

[75] Inventor: Masayuki Tsushima, Chofu, Japan

[73] Assignee: Tandy Electronics Japan Ltd., Tokyo, Japan

[21] Appl. No.: 229,126

[22] Filed: Aug. 5, 1988

[51] Int. Cl.⁵ .............................................. H04M 1/65
[52] U.S. Cl. ......................................... 379/77; 379/74
[58] Field of Search ....................... 379/74, 77, 75, 80, 379/82; 369/25, 28, 29; 360/60

[56] References Cited

U.S. PATENT DOCUMENTS 3,725,589  4/1973  Golden ................................. 379/77
4,431,872  2/1984  Edwards et al. ..................... 379/77

Primary Examiner—Stuart S. Levy
Assistant Examiner—James E. Tomassini
Attorney, Agent, or Firm—Wolf, Greenfield & Sacks

[57] ABSTRACT

An automatic telephone answering system including a recorder having an input and an output connected to a telephone line for the recording and playing of messages and which is remotely controllable through the use of a dual-tone signal. A recorder control apparatus controls the recorder and is connected to receive input signals sent over the telephone line to the recorder and output signals sent from the recorder. The recorder control apparatus generates an inhibit signal to the recorder when the recorder control apparatus detects the fact that at the input or output a signal having dual-tone frequencies continues for a predetermined maximum allowable time which is shorter than the minimum time for dual-tone signal detection, thereby preventing said signal having the dual-tone frequencies from being input to or output from the recorder over a time period longer than said minimum time for dual-tone signal detection.

17 Claims, 8 Drawing Sheets

RECORDER CONTROL APPARATUS FOR AUTOMATIC TELEPHONE ANSWERING SYSTEM

BACKGROUND OF THE INVENTION

1. Field of the Invention

The present invention relates to an automa,tic telephone answering system of the type which uses dual-tone, multiple frequency signals (DTMF) as remote control signals and, more particularly, to a recorder control apparatus used in such an automatic telephone answering system.

2. Background Discussion

A conventional automatic telephone answering system which can be remotely controlled by DTMF signals comprises, as shown in FIG. 10, a recorder 91 connected to a transformer 94 which is in turn connected to a telephone line, a remote control signal receiver/decoder section 93 connected to the transformer 94 and consisting of a DTMF receiver 95 for receiving DTMF remote control signals and microcomputer 96, and a line DTMF discriminator means 97 implemented by the micro computer 96 for discriminating DTMF signals from the telephone line. The recorder 91 records messages from the telephone line in a record mode and plays recorded messages and transmits them to the telephone line in a play mode.

It has heretofore been known that the recorder 91 records in the record mode not only the message of a caller but also the DTMF signals generated when the caller touches the telephone keys. The DTMF signals which are thus unintentionally recorded and generated upon playback should not be interpreted as true remote control signals. If these "false" DTMF signals are played from the recorder in the play mode, these signals are transmitted to the telephone line and applied to the remote control signal receiver/decoder sections 93 as well. In some cases, the receiver/decoder section 93 operated in the play mode accordingly mistakes the false DTMF signals for true DTMF remote control signals coming from the telephone line and this causes erroneous operation of the automatic telephone answering system.

In order to prevent such erroneous operation, the conventional automatic telephone answering system is provided with a line DTMF discriminator means. This discriminator means responds to a detected signal (DS) which is qenerated by the DTMF receiver of the receiver/decoder section 93 to indicate detection of a DTMF signal and, when the DS signal becomes high in level to indicate detection of such a signal, the discriminator means switches the line playing/transmitting circuit 99 off to detect whether or not the DS signal becomes low in level. That is, in the case where the DS signal becomes low when the playing/transmitting circuit 99 is switched off, the discriminator means 97 determines that the received DTMF signal is a false DTMF signal played by the recorder 91 and prevents the system from responding to this false DTMF signal. On the other hand, in the case where the DS signal remains high, the discriminator means 97 determines that the received DTMF signal is a remote control DTMF signal from the telephone line and causes the remote control signal decoder section 93 to respond to it.

In the conventional automatic telephone answering system described above, discrimination of the veracity of the remote control DTMF signals takes a relatively long time period, that is at least 80 ms (preferably 100 ms when variation in the quality of ICs is considered), since it is performed by checking the DS signal of the DTMF receiver (such as receiver 95).

More specifically, in order for the DS signal to become definitely high (i.e. recognition of DTMF signal), it takes at least 40 ms from the beginning of the DTMF signal and, on the other hand, in order for the DS signal to become definitely low, it takes at least 40 ms from the end of the DTMF signal. In the conventional system described above, therefore, a time period of at least 80 ms is necessary from the beqinning of the DTMF signal to completion of the discrimination of the veracity of the signal by the discriminator means 97.

As a result, in a case where one attempts to make the remote control from a telephone set which generates DTMF signals of durations shorter than 80 ms or where DTMF signals of such durations are used as remote control signals, a problem encountered in the conventional system described above has been that these DTMF remote control signals are all invalidated. Generally, duration of normal DTMF signals varies qreatly depending on the type of telephone set used. For example, some types of telephone set have a signal duration of as short as 50 ms. Thus, a problem arises in using this type of set to generate DTMF signals to remotely control the machine.

Further, in order to accurately discriminate the remote control DTMF signals in the conventional system, difficult design problems are encountered with respect to the setting of the delay times and guard times for detection of DS signals.

Accordingly, an object of the present invention is to provide an automatic telephone answering system which is simple in construction and remotely controllable without the need for validation of the remote control DTMF signals.

Another object of the present invention is to provide a recorder control apparatus for an automatic telephone answering system which is capable of responding to remote control DTMF signals of shorter duration.

SUMMARY OF THE INVENTION

To accomplish the foregoing and other objects, features and advantaqes of the invention there is now provided an automatic telephone answering system which, in accordance with the present invention, is constructed so as to limit to a predetermined value the period of time during which the signal of the DTMF dual-tone frequencies is inputted to the recorder installed therewith, or to limit to a predetermined value the period of time during which the signal is outputted from the recorder.

An automatic telephone answering system is described that includes a recorder having an input and an output connected to a telephone line for the recording and the playing of messages, and which is remotely controllable through the use of a DTMF signal. In accordance with the present invention there is a recorder control apparatus for controlling the recorder and connected to receive both the input ot or the output from the recorder. This recorder control apparatus generates an inhibit signal to the recorder when the recorder control apparatus detects the fact that at the input or the output a signal having DTMF frequencies continues for a predetermined maximum allowable time (hereinafter referred to as time "T max"). This is shorter than the minimum time for dual-tone signal detection (hereinafter referred to as time "Td"), thereby preventing the signal having the dual-tone frequencies from being input to or output from the recorder over a time period longer than the minimum time for dual tone signal detection.

With the control system of the present invention a signal having the DTMF frequencies is, when its duration is equal to or smaller than the predetermined maximum allowable time T max, allowed to be recorded or played and, on the other hand, when its duration exceeds the predetermined maximum allowable time T max, is limited to recording or playing thereof for only the predetermined maximum allowable time T max. As a result, the DTMF frequency signal is prevented from being recorded or played over a period of time equal to or longer than the minimum duration time Td which is required for the detection of the DTMF signal. Therefore, all of the DTMF frequency signals included in the signals played from the recorder are not detected as effective DTMF signals by the remote control signal receiver/decoder means. Accordingly, the present invention assures that all DTMF signals received by the receiver/decoder means are from the telephone line, thereby eliminating the necessity for the discrimination of the veracity of the DTMF remote control signals, which has heretofore been necessary.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
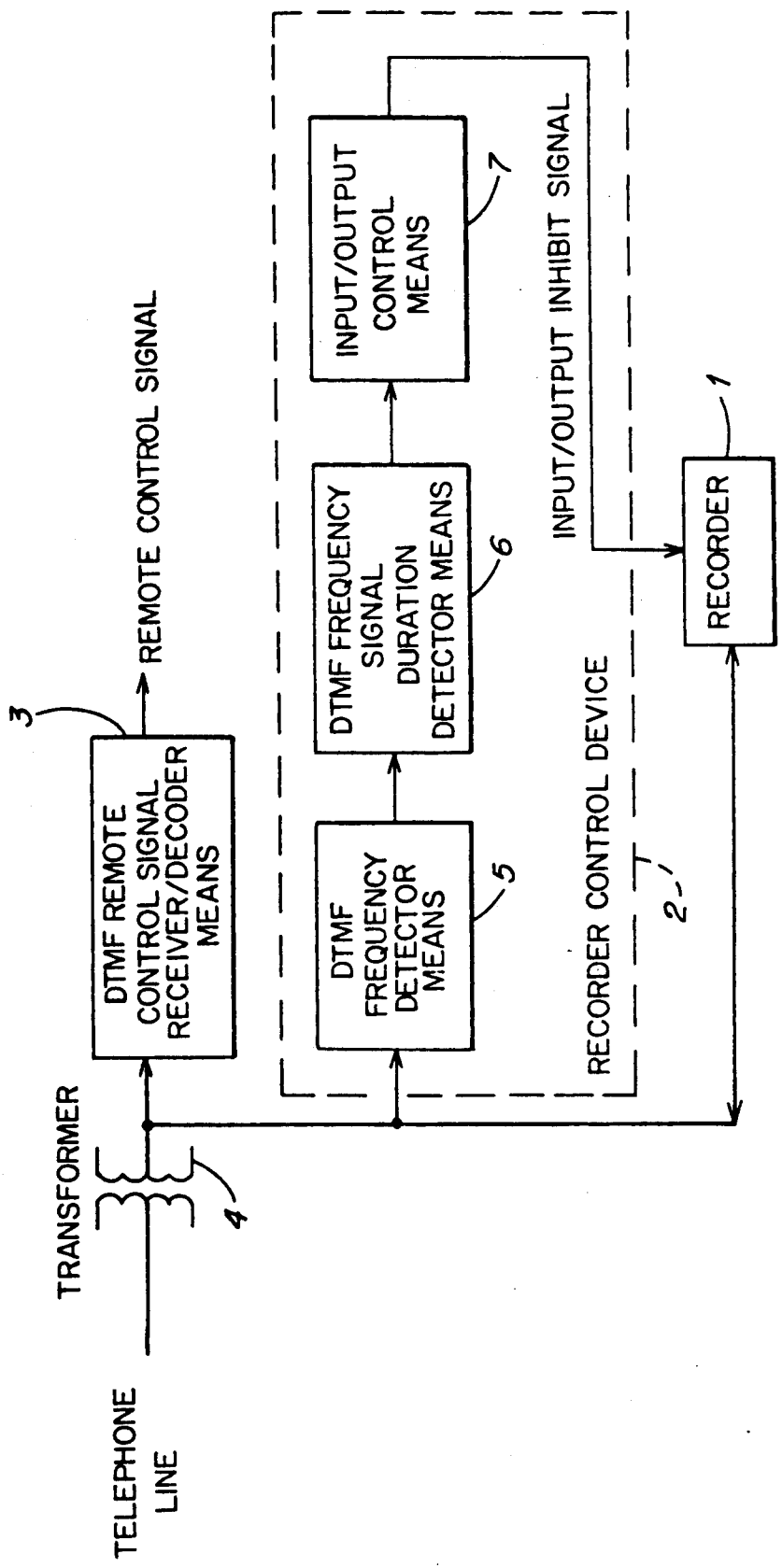
FIG. 1 is a block diagram showing the basic construction of the automatic telephone answering system according to the present invention.

Reference is now made to the drawings and in particular to FIG. 1 for an illustration of an automatic answering system according to the present invention. The system comprises a recorder 1 and a recorder control device 2 and also includes a DTMF remote control signal receiver/decoder means 3 as shown in the basic construction block diaqram of FIG. 1. The recorder 1 has its input and output connected to a transformer 4 coupled to the telephone line for the recording and the playing of messages. The recorder 1 can be remotely controlled with remote control signals generated by the receiver/decoder means 3 which operates to receive and decode remote DTMF signals.

The recorder control device 2 is selectively connected to the input or the output of the recorder 1, and the device 2 operates to generate an inhibit signal to the recorder 1 when it detects the fact that a signal having dual-tone frequencies continues at the input or output for a predetermined maximum allowable time T max which is shorter than the minimum allowable time Td for DTMF signal detection, thereby preventing the signal having the DTMF frequencies from being input to or output from the recorder 1 over a period of time longer than the minimum time Td for DTMF signal detection.

The recorder control device 2 comprises a frequency detector means 5 connected to the input or output of the recorder 1 for generating a frequency detection signal during the period of time in which it detects the signal having the DTMF frequencies, a duration detector means 6 connected to receive the frequency detection signal for generating a duration detection signal for as long as the frequency detection signal continues after the predetermined maximum allowable time, and a control means 7 connected to receive the duration detection signal for generating, in response to the duration detection signal, an inhibit signal for inhibiting the input to or output from the recorder 1.

In one embodiment of the present invention, the frequency detector means 5 is connected to the input of the recorder 1, and the control means 7 generates an inhibit signal for the inhibition of input to the recorder 1.

The inhibit signal is generated continuously or intermittently, as required, until the frequency detection signal disappears.

The control means 7 includes a switch connected between the transformer 4 and the input or output of the recorder 1, and the switch is opened by the inhibit signal, thereby enabling quick switching of the input or the output of the recorder 1.

The predetermined maximum allowable time T max mentioned above is selected to be longer than the duration of the DTMF frequency components included in the voice signals and noise.

In the automatic telephone answering system according to the present invention having the construction described above, a signal having the DTMF frequencies is, when its duration is equal to or smaller than the the predetermined maximum allowable time T max, allowed to be recorded or played and, on the other hand, when its duration exceeds the predetermined maximum allowable time T max, is limited to recording or playing thereof for the predetermined maximum allowable time T max. As a result, the DTMF frequency signal is prevented from being recorded or played over a period of time longer than the minimum duration which is required for the detection of the DTMF signal. Therefore, all of the DTMF frequency signals included in the signals played from the recorder 1 are not detected as effective DTMF signals by the remote control signal receiver/decoder means 3. Accordingly, the present invention ensures that all DTMF signals received by the receiver/decoder means 3 are from the telephone line, thereby eliminating the necessity for discrimination of the veracity of the DTMF remote control signals, which has heretofore been necessary.

Figure 2:
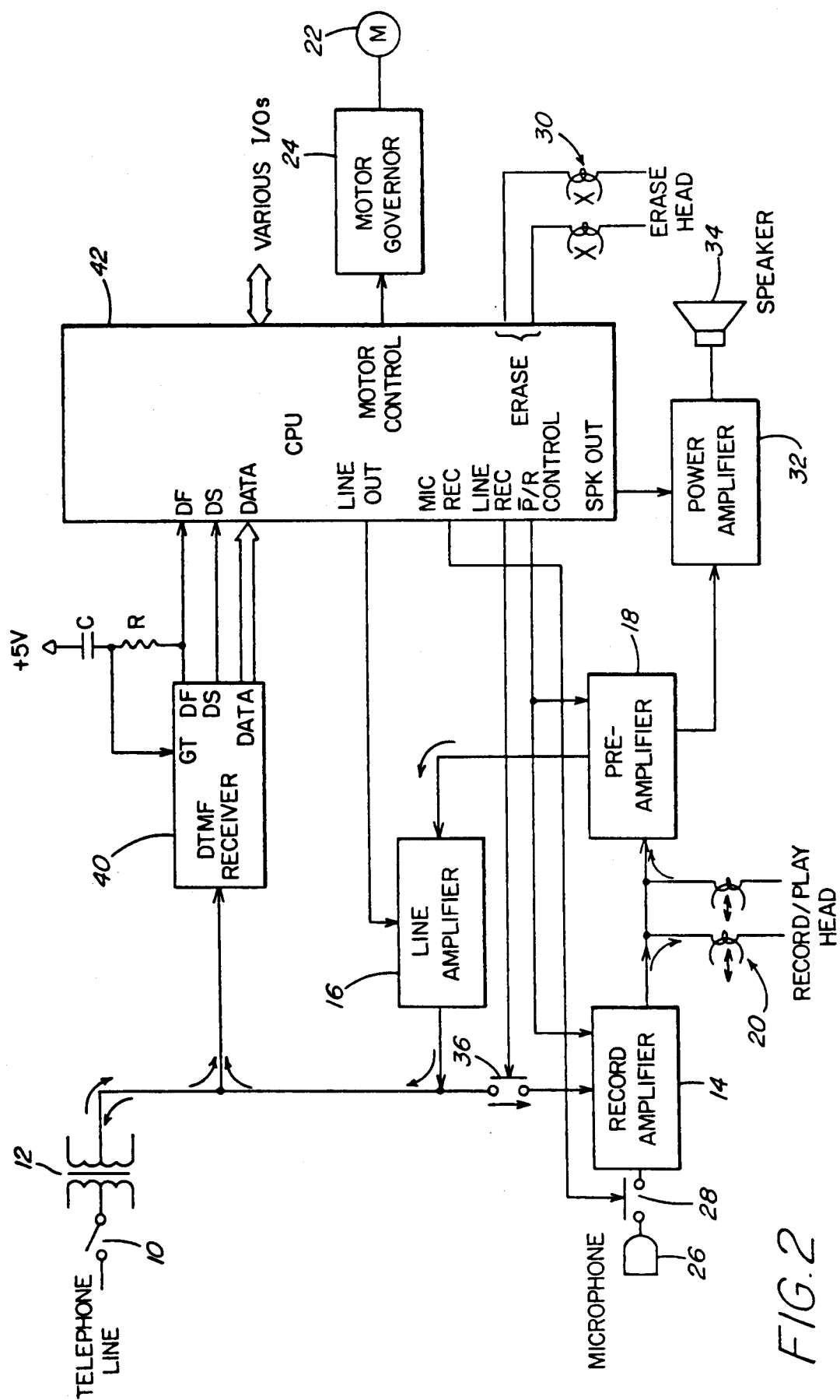
FIG. 2 is a circuit diagram of a first embodiment which is an automatic telephone answering system of the continuous record inhibition control type according to the present invention.

FIG. 2 shows a circuit diagram of an automatic telephone answering system of the record inhibition control type which is a first preferred embodiment of the present invention. This automatic telephone answering system is connected to a telephone line through a hook switch 10 and a transformer 12. This automatic telephone answering system includes as the recorder 1 a record amplifier 14, a line amplifier 16, a pre-amplifier 18, a record/play head 20, a recording tape drive motor 22, and a motor governor 24. The system further includes a microphone 26, a microphone record switch 28, an erase head 30, a power amplifier 32 and a speaker 34.

The automatic telephone answering system according to the present invention further includes, as the recorder control device 2 and the DTMF remote control signal receiver/decoder means 3 of FIG. 1, a DTMF receiver 40 (for example, DTMF Receiver MB 87017) and a microcomputer 42 (for example, HITACHI 4-bit Microcomputer HMCS404C).

More specifically, the record amplifier 14 includes a line record input terminal and a microphone record input terminal. The line record input terminal is connected to the transformer 12 through a line record switch 36 to record messages coming from the telephone line, while the microphone record input terminal is connected to the microphone 26 through the microphone record switch 28. The output of the record amplifier 14 is connected to the record/play head 20, and a played signal from the head 20 is applied to the input of the pre-amplifier 18. The output of the pre-amplifier 18 is applied to the line amplifier 16 and the power amplifier 32. The line amplifier 16 amplifies a received signal to the level required for transmission to the line and outputs it thereto. The DTMF receiver 40, comprising a filter section (not shown) and a decoder section (not shown), is connected to the transformer 12 and the output of the line amplifier 16 and includes, as shown in FIG. 2, a DTMF frequency detector (DF) terminal, a DTMF signal detector (DS) terminal, a data (DATA) terminal, and a guard time (GT) setting terminal. The guard time is determined by the time constant of a capacitor C and a resistor R connected to the GT terminal. The DF terminal becomes high after a detection start delay time Tpdf from the start of the reception of the DTMF frequency signal, and becomes low after a detection end delay time Tadf from the end of the reception. The DS terminal becomes high after a first guard time Tgtp from the time point at which the DF terminal became high, and becomes low after a second guard time Tgta from the time point at which the DF terminal becomes low. When the DS terminal is high, the DTMF receiver 40 determines that an effective DTMF signal has been received, and then the receiver 40 outputs to the DATA terminal the data obtained by decoding the received DTMF signal. The DS output from DTMF receiver 40 forms the output from the receiver section of the remote control signal receiver/decoder means 3 of FIG. 1, and the DF terminal of the DTMF receiver 40 forms the DTMF frequency detector means 5 of the recorder control device 2.

The microcomputer 42 having terminals for respectively receiving the DF signal, the DS signal and the data further includes, as input and output terminals and control signal terminals, a line transmission (LINE OUT) terminal, a microphone record (MIC REC) terminal, a line record (LINE REC) terminal, a play/record control (P/R CONTROL) terminal, a speaker output (SPK OUT) terminal, erase (ERASE) terminals, and a motor control (MOTOR CONTROL) terminal.

The CPU 42 receives the DS signal and the data, and generates a remote control signal by decoding the data. However, these operations are well known and will not be described in detail.

In the record mode of the automatic telephone answering system, the CPU 42 turns the record amplifier 14 on and the pre-amplifier 18 off by a hiqh play/record control signal at the play/record control terminal. In case of line recording in this record mode, the CPU 42 closes the line record switch 36 by a low line record signal at the line record (LINE REC) terminal, and in case of microphone recording, the CPU 42 closes the microphone record switch 28 by a hiqh signal at the microphone record (MIC REC) terminal.

In the play mode, the CPU 42 turns the record amplifier 14 off and the pre-amplifier 18 on by a low signal at the play/record control terminal and also turns the line amplifier 16 on by a high signal at the line transmission terminal. The signal of the speaker terminal switches the power amplifier 32 on when the speaker is designated to play. In the record mode, play mode and other modes of the recorder, the motor control terminal generates appropriate signals to drive the tape drive motor 22 through the motor governor 24. In this embodiment, a signal of the line record terminal is used as the inhibit signal of FIG. 1.

Now, the maximum allowable time T max mentioned above will be described. This maximum allowable time Tmax is selected to be a value which is smaller than the minimum duration of DTMF signals being detected as effective DTMF signals, which must be at least 40 ms according to EIA specification number RS-470, and larger than the maximum duration of DTMF frequency signals included in voice signals or noise. The minimum duration required for an effective DTMF signal in this embodiment is Td, the sum of the detection start delay time Tpdf and the first guard time Tgtp. In this embodiment, since Tpdf and Tgtp are 14 ms and 40 ms, respectively, the required minimum duration Td is 54 ms. On the other hand, the maximum duration of the DTMF frquency components included within the voice signals and the like is, in general, 24 ms. Accordingly, the maximum duration Tmax is selected as Tmax = 34 ms (= 14 ms +20 ms) in this embodiment.

Figure 3:
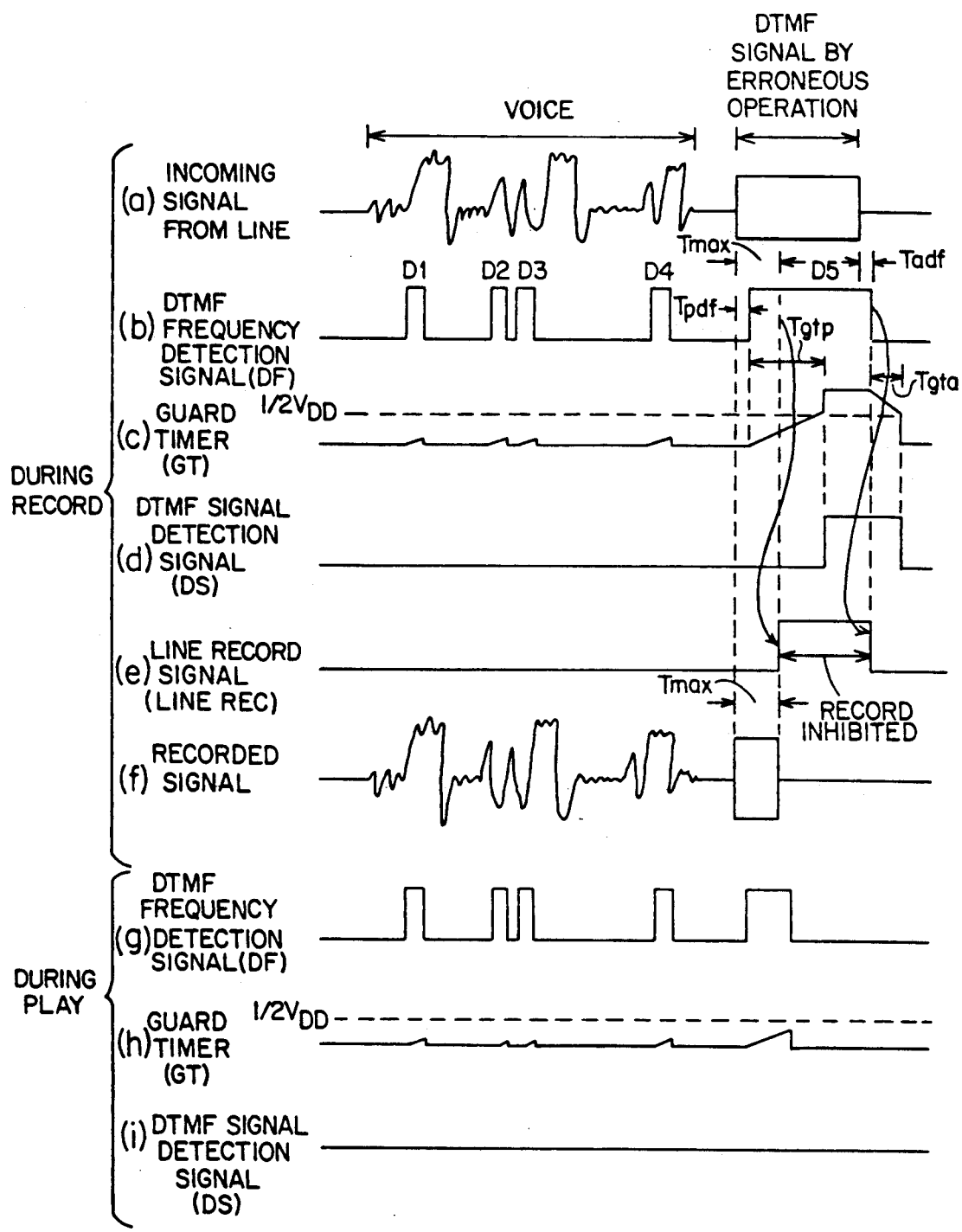
FIG. 3 is a waveform diagram of various signals of the circuit of the first embodiment.

Next, record inhibiting operation of the automatic telephone answering system of this embodiment will be described with reference to the waveform diaqram of FIG. 3 and the chart of record flow executed by the CPU 42 shown in FIG. 4.

Figure 4:
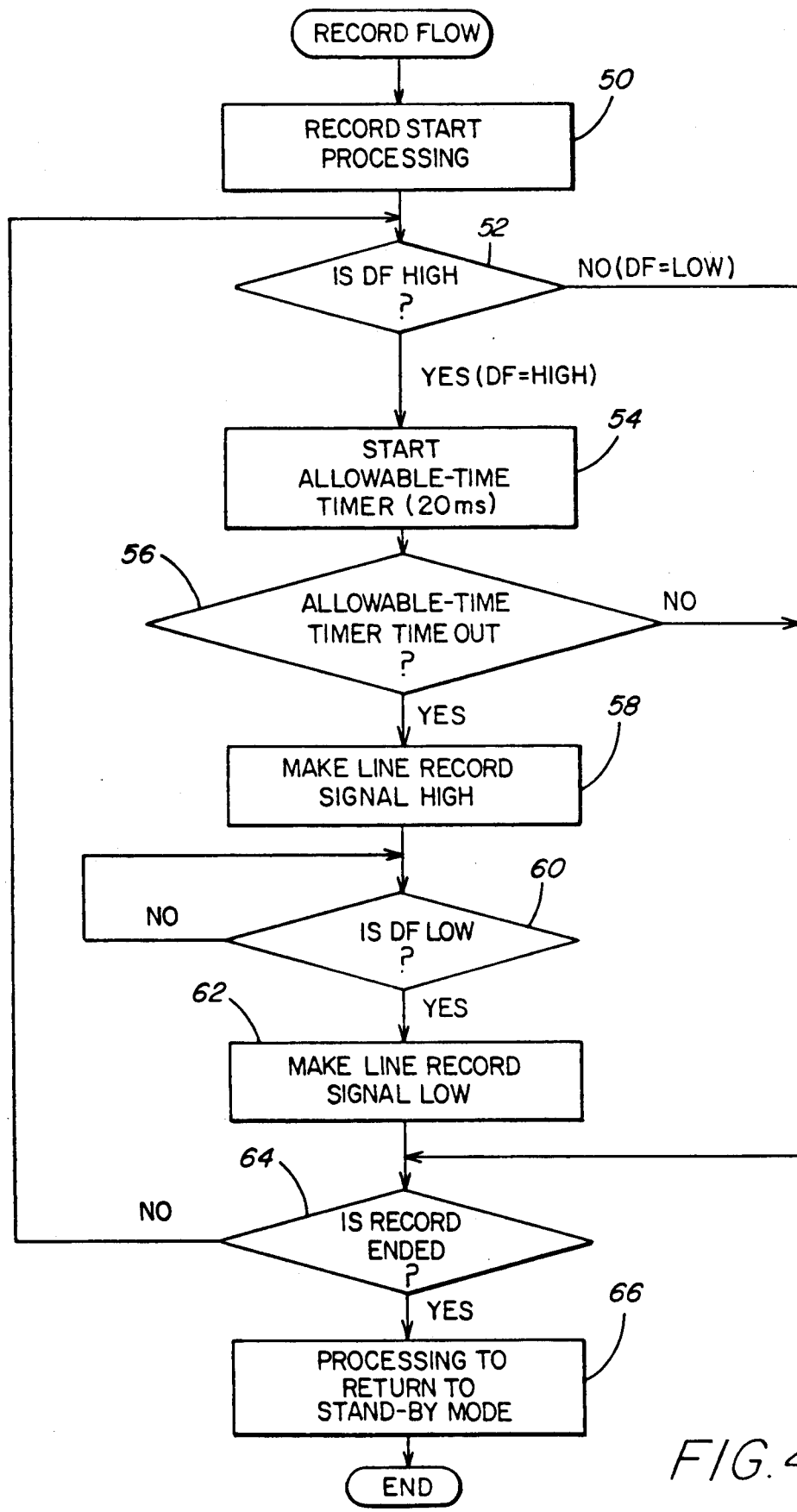
FIG. 4 is a flow chart of the record flow executed by the CPU in the first embodiment.

When the record mode is selected, the CPU 42 enters the record flow of FIG. 4 and, in the first step 50, starts the recording operation thereby making a high the play/record control terminal and making low the line record terminal, thereby closing switch 36. At this time, if a signal shown in FIG. 3(a) comes in from the telephone line, this signal is input to the DTMF receiver 40 and the record amplifier 14. This incoming signal is assumed to contain, as shown, the voice message signal of a caller and a DTMF signal caused by erroneous operation of the telephone keys. Then, in step 52, it is checked whether the DF is high or not. In case of NO, since there is no input of DTMF frequency signal, the operation proceeds to step 64, in which the end of recording is detected, for example, by checking time-out of a record timer (for example, 30 seconds). In case of NO, the flow is looped to step 52. During this time, the incoming signal is recorded on the recording tape.

In case of YES in step 52, the flow proceeds to step 54, in which an allowable-time timer set to 20 ms is started. The time 20 ms is obtained by subtracting the detection start delay time Tpdf from the maximum allowable time Tmax (=34 ms). In the next step 56, "time-out" of the allowable-time timer is checked. In the DF signal shown in FIG. 3(b), since none of the high durations D1, D2, D3 and D4 caused by the voice signal exceeds 10 ms (the maximum duration 24 ms - the detection start delay time Tpdf), "time-out" of the allowable-time timer does not occur and, accordingly, the flow proceeds to step 64. The guard timer does not reach "time-out" either. During this time, the incoming signal is recorded as it is. In step 64, the end of recording is checked and in case of NO, the flow is looped to step 52, again.

In case of YES in step 56, that is, when the D5 portion of the DF signal caused by the DTMF signal portion of the incoming signal shown in FIG. 3(a) reaches 20 ms, the flow proceeds to step 5B. At this time, the guard timer does not reach "time-out" yet, and thus the DS signal shown in FIG. 3(d) remains low. In step 58, the line record signal is made high as shown in FIG. 3(e), whereby the switch 36 is opened to interrupt the inputting of the incoming signal to the record amplifier 14. During this time, the tape driving motor 22 is controlled to allow its operation to continue. In the next step 60, DF is checked until it becomes low. When the DF becomes low, the flow proceeds to step 62, in which the line record signal is made low, thereby starting the line record again. While the line record signal is high, silence is recorded in the recording tape.

Also, during this time, the guard timer reaches time-out and the DS signal becomes high. However, this DTMF signal, which is determined to be effective, is ignored since remote control is permitted only during the play mode.

Ultimately, as shown in FIG. 3(f), a DTMF signal is recorded for the maximum allowable time Tmax but recording of the signal for longer than that is inhibited. In the next step 64, the end of recording is checked and in case of NO, the flow is looped to step 52 to repeat the above described processings. In case of YES, the flow proceeds to step 66, in which a processing for returning the automatic telephone answering system to the standby mode is executed, and then this routine ends.

When the recorded signal shown in FIG. 3(f) is played in the play mode and transmitted to the line, the DTMF receiver 40 receiving this played signal has a DF signal, guard timer signal and DS signal having the waveforms shown in FIGS. 3(g), 3(h) and 3(i), respectively. That is, the DS signal is not made high by any of the high portions of the DF signal. Accordingly, the DTMF receiver 40 does not detect any DTMF frequency signal included within the played signal from the recorder as an effective DTMF signal, thereby preventing erroneous operation of the remote control unit.

Figure 5:
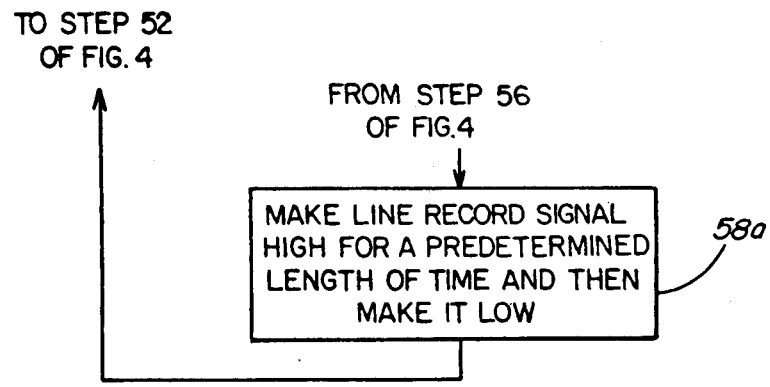
FIG. 5 is a partial flow chart showing only a chanqed portion in the record flow executed by the CPU in accordance with a second embodiment which is an automatic telephone answering system of the intermittent record inhibition type according to the present invention.
Figure 6:
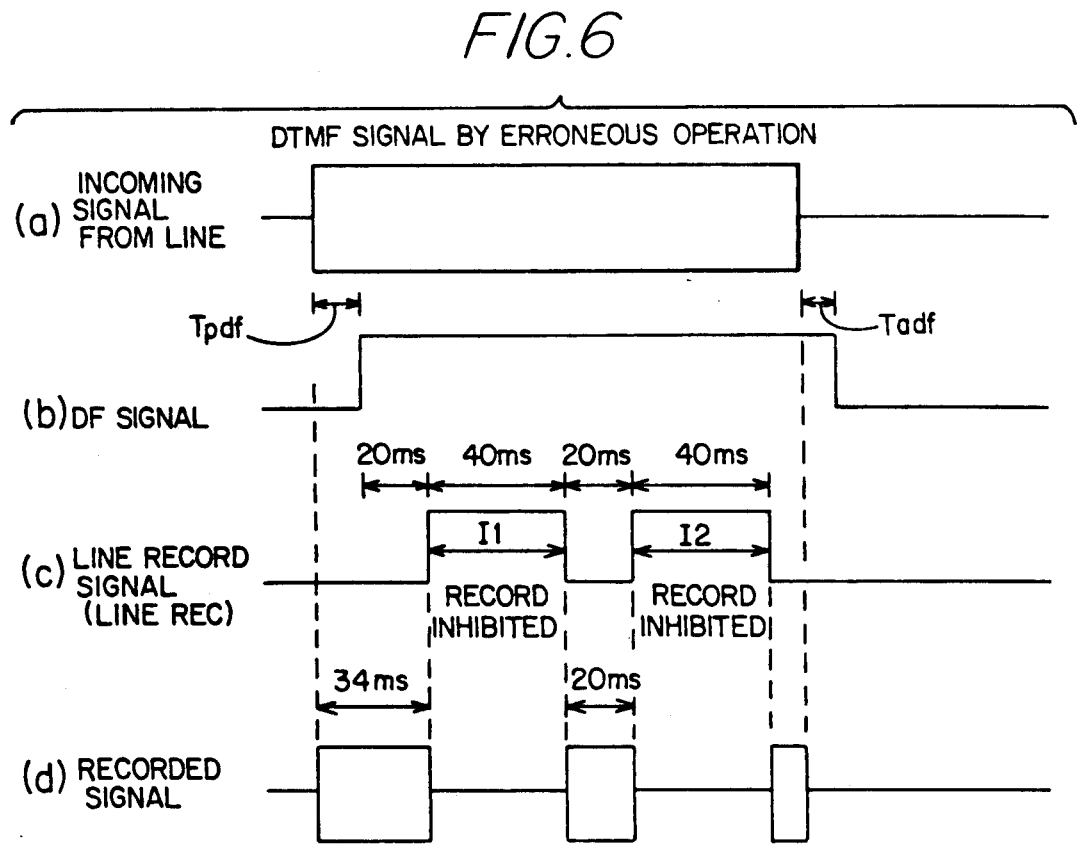
FIG. 6 is a waveform diagram of various signals generated in the second embodiment.

The second embodiment of the record inhibition control type characterized by intermittent inhibition will now be described with reference to FIGS. 5 and 6. FIG. 5 shows only a changed portion of the record flow of FIG. 4, and FIG. 6 shows waveforms of representative signals indicating the intermittent inhibition. This embodiment is advantaqeously applicable to the case where a DTMF signal caused by an erroneous operation continues for a relatively long time as shown in FIG. 6(a).

Step 58a of FIG. 5 replaces steps 58, 60 and 62 of FIG. 4. The flow enters 58a at the time of detection of "time out" of the allowable time timer in the decision step 56. At this time, in step 58a, the line record signal is made high for a predetermined length of time, for example 40 ms (the first high time period I1 in FIG. 6(c)) and is then made low again, and therafter the flow is looped to step 52. Since the DF signal (FIG. 6(b)) remains high, steps 52 and 54 of FIG. 4 are passed, and then the allowable-time timer times out in step 56, step 58a then being commenced again. Here, the second high time period I2 is caused and the above described processes are repeated. At this time, in step 56, however, the allowable-time timer does not reach "time out", and thus the flow proceeds to step 64. As a result of the line record signal having intermittent high time periods, three DTMF signals, the longest of which has a duration of 34 ms, are recorded on the tape at 40 ms intervals as shown in FIG. 6(d). These DTMF signals are not determined to be effective DTMF signals by the DTMF receiver 40 upon playback.

The intermittent inhibition described above causes a voice message to be recorded intermittently when DTMF signal of long duration caused by erroneous operation overlaps the voice message.

Figure 7:
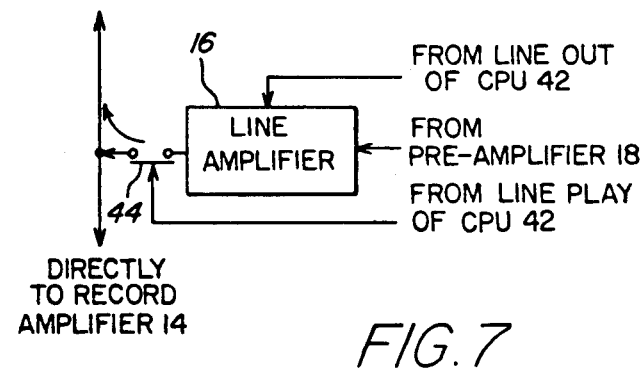
FIG. 7 is a partial circuit diagram showing only that portion of the circuit of FIG. 2 that is modified in accordance with a third embodiment which is an automatic telephone answering system of the intermittent play inhibition type according to the present invention.
Figure 9:
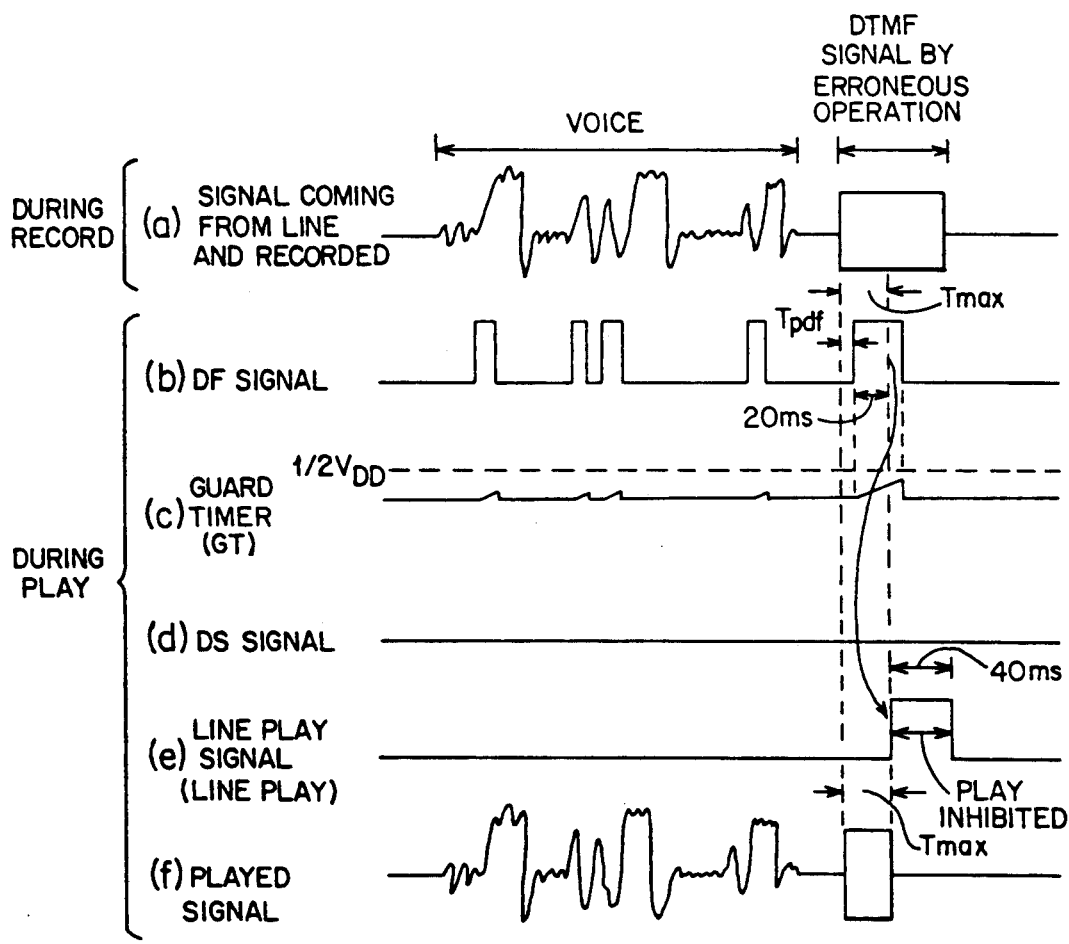
FIG. 9 is a waveform diagram of various signals generated in the third embodiment.

Next, the third embodiment of the play inhibition control type will be described with reference to FIGS. 7, 8 and 9. FIG. 7 shows only a modified portion of the circuit of FIG. 2, FIG. 8 shows the play flow to be executed by the CPU 42, and FIG. 9 shows waveforms of various signals of that time.

As shown in FIG. 7, for the play inhibition control, the line record switch 36 of FIG. 2 is removed and a line play switch 44 is connected in its place between the transformer 12 and the output of the line amplifier 16. The line record terminal of the CPU 42 is used as the line play (LINE PLAY) terminal, and the switch 44 is controlled by a signal from said terminal.

Figure 8:
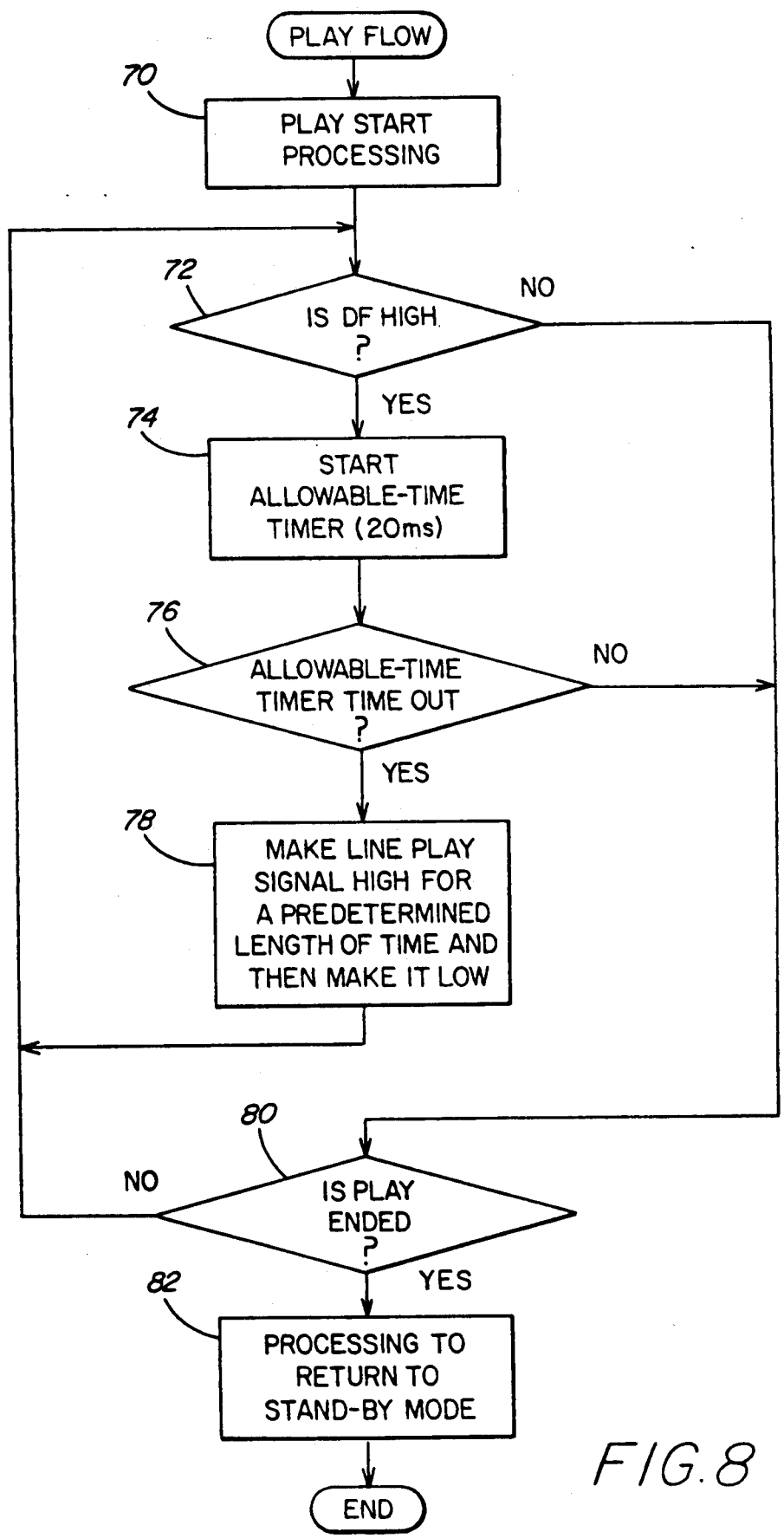
FIG. 8 is a flow chart of the play flow executed by the CPU in the third embodiment.
Figure 10:
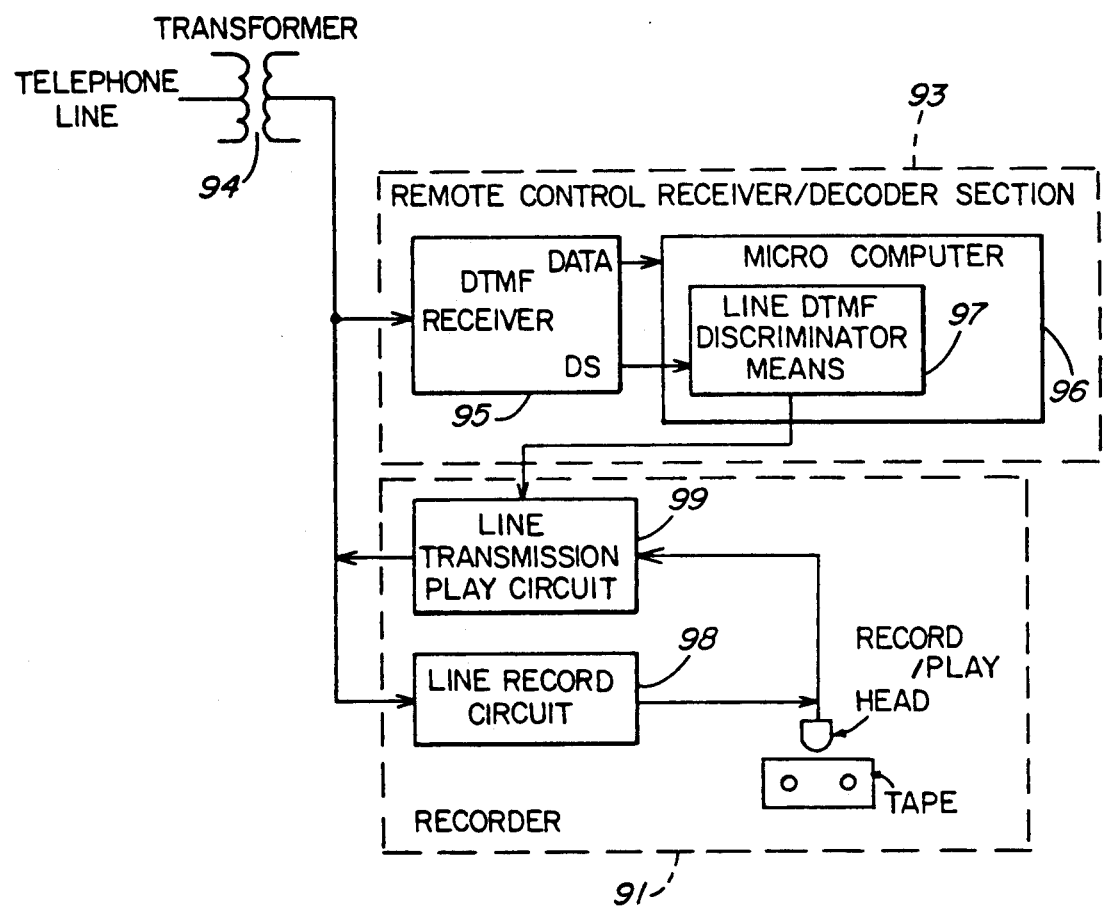
FIG. 10 is a schematic block diaqram of a conventional DTMF remote controllable automatic telephone answering system.

The play flow shown in FIG. 8 is substantially identical to the record flow of FIG. 4 as modified by FIG. 5 except in regard to steps 70 and 80. At first, it is assumed that, in the record mode prior to the play mode in which the play flow is executed, a signal including a voice message from the caller and an erroneous DTMF signal as shown in FIG. 9(a) have arrived from the telephone line. Assume further that the signals recorded in that state on the recording tape.

Under such condition, in the play mode subsequent to the recording mode a play start processing is executed in step 70. That is, the e,ovs/play/ /record control terminal is made low to turn the pre-amplifier 18 on, the line out terminal is made high to turn the line amplifier 16 on, the line play terminal is made low to close the switch 44, and an appropriate motor control signal is generated. Succeeding steps 72, 74, 76 and 78 are identical to steps 52, 54, 56 of FIG. 4 and step 58a of FIG. 5, respectively, in which the line play signal is made high for a predetermined length of time, for example 40 ms (FIG. 9(e)), each time the allowable-time timer which is set to 20 ms reaches "time-out". In all other cases, the flow proceeds to step 80, in which the end of play is decided by checking the "time-up" of, for example, a play timer (set to, for example 30 seconds).

As a result, the signal which is played and applied to the telephone line and the DTMF receiver 40 includes a DTMF signal having the duration of the maximum allowable time Tmax as shown in FIG. 9(f). The DTMF receiver 40 does not determine that the played DTMF signal is an effective DTMF signal. If step 80 is YES, a processing for returning to the stand-by mode is performed in step 82, and then this flow ends. As seen from the foregoing description, an effect equivalent to that which is obtained by record inhibition control can be obtained by play inhibition control. The ultimate effect of both methods is to ensure that effective erroneous DTMF signals never travel from the tape to the telephone line.

In the automatic telephone answering system according to the present invention, as described hereinabove, it is implemented by means of a simple construction to prevent the remote control unit from operating erroneously due to DTMF signals unintentionally caused by the caller and to make the automatic telephone answering system respond to DTMF remote control signals of shorter duration.

Having now described a limited number of embodiments of the present invention, numerous other embodiments and modifications thereof are contemplated as falling within the scope of the present invention as defined by the appended claims.

What is claimed is:

1. An automatic telephone answering system which includes a recorder having an input and an output connected to a telephone line for the recording and the playing of messages and which is remotely controllable through the use of a dual-tone signal, said dual-tone signal including DTMF command signals caused by proper operation of the telephone keys and may include voice signals, noise signals, and false DTMF signals comprising:
   a recorder control apparatus for controlling said recorder and selectively connected to at least one of said input and output of said recorder;
   said recorder control apparatus including means for detecting said dual-tone signal with a minimum time Td for dual-tone signal detection;
   said recorder control apparatus further includes means for generating an inhibit signal to said recorder when the recorder control apparatus detects the occurrence of a signal having dual-tone frequencies continuing for a predetermined maximum allowable time, T max, which is less than said minimum time Td, thereby preventing said signal having the dual-tone frequencies from being input to or output from said recorder over a time period longer than said minimum time Td.

2. An automatic telephone answering system as set forth in claim 1, characterized in that said recorder control apparatus comprises:
   a. frequency detector means connected to said input or output of said recorder for generating a frequency detection signal during the time when the frequency detector means detects said signal having the dual-time frequencies;
   b. duration detector means connected to receive said frequency detection signal for generating a duration detection signal for as long as said frequency detection signal continues after said time T max; and
   c. control means connected to receive said duration detection signal for generating, in response to said duration detection signal, said inhibit signal for inhibiting input to or output from said recorder.

3. An automatic telephone answering system as set forth in claim 2, characterized in that said frequency detector means is connected to said input of said recorder and said control means generates said inhibit signal for inhibiting input to said recorder.

4. An automatic telephone answering system as set forth in claim 2, characterized in that said frequency detector means is connected to said output of said recorder and said control means generates said inhibit signal for inhibiting output from said recorder.

5. An automatic telephone answering system as set forth in claim 3, characterized in that said inhibit signal is continuously generated until said frequency detection signal disappears.

6. An automatic telephone answering system as set forth in claim 3, characterized in that said inhibit signal is intermittently generated until said frequency detection signal disappears.

7. An automatic telephone answering system as set forth in claim 4, characterized in that said inhibit signal is intermittently generated until said frequency detection signal disappears.

8. An automatic telephone answering system as set forth in claim 2, characterized in that said control means includes a switch connected between said telephone line and said input or said output, and said switch is opened in response to said inhibit signal.

9. An automatic telephone answering system as set forth in claim 1, characterized in that said time T max is longer than the duration of dual-tone frequency signals included in voice signals or noise.

10. In an automatic telephone answering system including a recorder having an input and an output and connected to a telephone line for the recording and the playing of messages, and which is remotely controllable through the use of a dual-tone signal, said dual-tone signal including DTMF command signals caused by proper operation of the telephone keys and may include false DTMF signals caused by noise signals, voice signals, or improper operation of the telephone keys, the improvement comprising:
   a recorder control apparatus for controlling said recorder and connected thereto, said recorder control apparatus including means for detecting said dual-tone signal with a minimum time Td for dual-tone signal detection;
   said recorder control apparatus further including means for permitting a dual-tone signal to be recorded or played when its duration is equal to or less than a predetermined maximum allowable time, T max which is less than said minimum time Td, said permitting means limiting the recording or playing of said dual-tone signal to the time T max when the dual-tone signal has a duration exceeding said maximum time T max.

11. An automatic telephone answering system as set forth in claim 10 wherein the dual-tone signal includes a DTMF signal that is prevented from being recorded or played over a period longer than said minimum time Td.

12. An automatic telephone answering system as set forth in claim 11 wherein all of the DTMF frequency signals included in the signals played from the recorder are not detected as effective DTMF signals by the remote control apparatus.

13. An automatic telephone answering system as set forth in claim 12 wherein all DTMF signals received by the DTMF receiver means are from the telephone line, thereby eliminating the necessity for discrimination of the veracity of the DTMF of the remote control signals.

14. In an automatic telephone answering system including a recorder having an input and an output connected to a telephone line for the recording and playing of messages and which is remotely controllable through the use of a dual-tone signal, a method for controlling the recorder comprising the steps of:

detecting the dual-tone signal, with a minimum time Td for such detection;

inhibiting the recorder when the dual-tone signal having dual-tone frequencies continues for a predetermined maximum allowable time, T max, which is less than said minimum time Td;

thereby preventing the signal having the dual-tone frequencies from being input to or output from the recorder over a period of time longer than the minimum time Td.

15. A method as set forth is claim 14 wherein the inhibit signal is continuously generated until the sensed dual-tone signal disappears.

16. A method as set forth in claim 15 wherein the inhibit signal is intermittently generated until the sensed dual-tone signal disappears.

17. A method as set forth in claim 14 wherein the predetermined maximum allowable time T max is longer than the duration of dual-tone frequency signals included in voice signals or noise.

* * * * *

UNITED STATES PATENT AND TRADEMARK OFFICE
CERTIFICATE OF CORRECTION

PATENT NO. : 5,010,567
DATED : April 23, 1991
INVENTOR(S) : Tsushima

It is certified that error appears in the above-identified patent and that said Letters Patent is hereby corrected as shown below:

Col. 9, line 61 - change "dual-time" to --dual-tone--.

Col. 10, line 11 - change "qenerates" to --generates--.

Col. 10, line 15 - change "qenerated" to --generated--.

Col. 10, line 58 - strike "maximum".

Signed and Sealed this

Twentieth Day of October, 1992

Attest:

DOUGLAS B. COMER

Attesting Officer

Acting Commissioner of Patents and Trademarks